Patented Mar. 15, 1927.

1,621,038

UNITED STATES PATENT OFFICE.

KARL B. THEWS, OF SAWPIT, COLORADO, ASSIGNOR TO COLORADO VANADIUM CORPORATION, OF NEW YORK, N. Y., A CORPORATION OF COLORADO.

PROCESS OF RECOVERING VANADIUM.

No Drawing. Application filed October 29, 1920, Serial No. 420,489. Renewed August 9, 1926.

This invention relates to a process of recovering vanadium, and aims to provide improvements therein.

The invention provides a process involving the precipitation of soluble vanadates, especially from impure solutions, in the form of calcium vanadate, wherein cleaner and more pure precipitates are secured, and wherein, consequently, in the further treatment of the precipitate, a final product (usually vanadic acid) of high purity may be obtained.

Solutions of soluble vanadates, obtained by direct leaching of vanadium ores, or by leaching ores which have been heated with a flux, or otherwise, almost invariably are contaminated with iron and aluminum salts or compounds, and, in the precipitation of the vanadium constituent from such ores, by the use of a calcium reagent, the precipitate is contaminated with such iron and aluminum; in fact, calcium precipitates obtained by previous methods have been of very low vanadium content, with relatively high iron and aluminum content.

According to the present invention, to such impure solutions of soluble vanadates there is added an oxidizing agent for the purpose of changing the lower oxids of vanadium, such as $V_2O_3$ or $V_2O_4$ (or combinations thereof in salts) which may be, and in fact almost invariably are, present in such solutions, into the higher oxid, pentoxid ($V_2O_5$).

The preferred agent for oxidizing is sodium chlorate though a variety of other oxidizing agents may be used, as, for example, ammonium nitrate, sodium nitrate, nitric acid, hydrogen peroxide, etc.

The quantity of the oxidizing agent to be added is best determined by taking a sample of the solution of soluble vanadate, and ascertaining the proportion of the oxidizing agent necessary to raise the lower oxids to the pentoxid, and also to raise the iron oxids or oxy-compounds to their higher oxids or oxy-compounds.

To the solution in which the lower oxids of vanadium have been raised to the pentoxid, there is added a calcium reagent, conveniently a solution of calcium chloride, and it is best to stir the solution well during the addition of the reagent. Calcium vanadate is formed, which, being insoluble in the solution, precipitates.

The oxidizing agent also acts upon the iron compounds in the solution, more completely oxidizing them, and these more completely oxidized iron compounds have less tendency to react with the calcium reagent than the lesser oxids, so that the reaction between the calcium reagent and the vanadic oxid (pentoxid $V_2O_5$) is not interfered with, and in consequence the precipitated calcium vanadate is one of exceptional purity.

The solution from which the calcium vanadate is precipitated may be either, neutral, or acid preferably acid, as described in companion application, Serial No. 420,488, filed October 29, 1920.

The addition of the calcium reagent is continued until the quantity of the precipitate which is formed indicates that the amount of vanadic acid ions in solution is nearly exhausted.

After the precipitation is complete, the precipitated calcium vanadate is conveniently separated from the solution by filtration.

The calcium vanadate may be further treated in any suitable manner.

Preferably, however, the calcium vanadate is treated to obtain a final product in the form of an oxid of vanadium, i. e., vanadic acid ($V_2O_5$), as set forth and claimed in companion application Serial No. 420,488, filed October 29, 1920.

The invention may be practiced in other modes of procedure than that herein specifically described.

What is claimed is:

In a process of recovering vanadium, adding an oxidizing agent to a solution of soluble vanadates contaminated with iron and aluminum compounds, and adding a calcium reagent and keeping the solution non-alkaline to precipitate calcium vanadate.

In witness whereof, I have hereunto signed my name.

KARL B. THEWS.